(12) United States Patent
De Groot

(10) Patent No.: US 8,780,334 B1
(45) Date of Patent: Jul. 15, 2014

(54) TOPOGRAPHICAL PROFILING WITH COHERENCE SCANNING INTERFEROMETRY

(75) Inventor: Peter De Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 149 days.

(21) Appl. No.: 13/433,697

(22) Filed: Mar. 29, 2012

Related U.S. Application Data

(60) Provisional application No. 61/570,408, filed on Dec. 14, 2011.

(51) Int. Cl.
*G01B 9/02* (2006.01)

(52) U.S. Cl.
USPC ......................... 356/28.5; 356/516

(58) Field of Classification Search
USPC ....................................................... 356/28.5
See application file for complete search history.

(56) References Cited

U.S. PATENT DOCUMENTS

| | | | |
|---|---|---|---|
| 5,398,113 A | 3/1995 | De Groot | |
| 6,775,006 B2 * | 8/2004 | Groot et al. | 356/497 |
| 6,989,905 B2 | 1/2006 | De Groot | |
| 7,106,454 B2 | 9/2006 | De Groot et al. | |
| 7,605,925 B1 | 10/2009 | Chen | |

OTHER PUBLICATIONS

H.-G. Rhee, T V. Vorburger, J. W. Lee, and J. Fu, "Discrepancies between roughness measurements obtained with phase-shifting and white-light interferometry," Appl. Opt. 44, 5919-5927 (2005).
A. Harasaki, J. Schmit and J. C. Wyant, "Improved vertical-scanning interferometry", Appl. Opt. 13(39), 2107-2115 (2000).
P. de Groot, X. Colonna de Lega, J. Kramer and M. Turzhitsky "Determination of fringe order in white light interference microscopy," Appl. Opt. 41(22) 4571-4578 (2002).

* cited by examiner

*Primary Examiner* — Isam Alsomiri
*Assistant Examiner* — Vicente Rodriguez
(74) *Attorney, Agent, or Firm* — Fish & Richardson P.C.

(57) ABSTRACT

Determining a height profile of a test object surface includes obtaining, from a scanning interferometry device, scanning interferometry data for the test object surface, calculating a coherence profile of the test object surface and a phase profile of the test object surface based on the scanning interferometry data, calculating an phase gap map based on the coherence profile and the phase profile, modifying the coherence profile based on the phase gap map to obtain a corrected coherence profile, and determining a height of the test object surface based on the corrected coherence profile.

26 Claims, 9 Drawing Sheets

| Appearance | 2D Profile | Interpretation |
|---|---|---|
| Constant over the field of view | 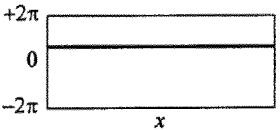 | This is the ideal case: Constant regardless of surface form or features |
| Overall tip or tilt | 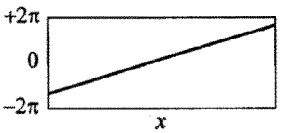 | Unbalanced wedge dispersion in cube beamsplitter (Michelson and Linnik objectives). |
| Steps that appear to correlate to changes in materials or films | 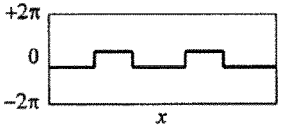 | Differences in phase change on reflection between surface regions |
| Shape that correlates to surface form | 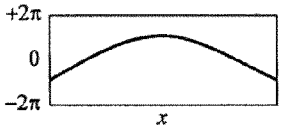 | Surface-slope dependent distortions related to optical aberrations. |
| Spikes | 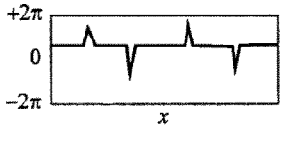 | Residual effects of diffraction at sharp edges of surface features, e.g. steps |
| Noise | 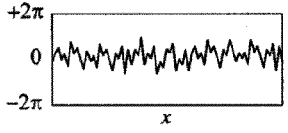 | Surface roughness, optical speckle or very low signal level |

FIG. 6

TOPOGRAPHICAL PROFILING WITH COHERENCE SCANNING INTERFEROMETRY

CROSS-REFERENCE TO RELATED APPLICATIONS

This application claims priority from U.S. Provisional Application Ser. No. 61/570,408, filed on Dec. 14, 2011, which is incorporated herein by reference in its entirety.

BACKGROUND

Coherence Scanning Interferometry refers to a type of 3D imaging interference microscopy technique, in which measurement of a surface profile of an object is based at least in part on a localization of interference fringes produced by the interference of a reference wave and a measurement wave reflected from the object's surface. Conceptually, the interference signal recorded by a detector pixel includes interference fringes modulated by a coherence envelope. Thus, the interference signal including the fringes contains two pieces of information regarding the surface profile of the object: the localization of the fringes (the coherence information) and the phase of the quasi-periodic oscillations (the phase information). Local surface height information can be calculated from the recorded interference signals based on the features of the modulation envelope such as the peak signal or centroid (coherence profiling) or based on the phase of the interference fringes (phase profiling).

SUMMARY

The subject matter of this disclosure relates to 3D topographical profiling with coherence scanning interferometry.

In general, one aspect of the subject matter described in this specification can be embodied in methods for determining a height profile of a test object surface, in which the methods include obtaining, from a scanning interferometry device, scanning interferometry data for the test object surface, calculating a coherence profile of the test object surface and a phase profile of the test object surface based on the scanning interferometry data, calculating an phase gap map based on the coherence profile and the phase profile, modifying the coherence profile based on the phase gap map to obtain a corrected coherence profile, and determining a height of the test object surface based on the corrected coherence profile.

Other embodiments of this aspect include corresponding computer systems and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. For example, in some implementations, calculating the phase gap map includes expressing the coherence profile and the phase profile in common units. The common unit can include radians.

In some implementations, calculating the phase gap map includes calculating a difference between the coherence profile and the phase profile to obtain an experimental phase gap map. Calculating the phase gap map can further include reducing noise of the experimental phase gap map. Reducing noise can include, for example, applying a smoothing filter to the experimental phase gap map. The smoothing filter can include a pixel-averaging algorithm or a convolution algorithm. Reducing noise can further include calculating a disconnected phase gap map based on a difference between the experimental phase gap map and a smoothed phase gap map. Reducing noise further can include removing $2\pi$ steps from the disconnected phase gap map to obtain a connected phase gap map. Reducing noise can further include filling in unconnected pixels of the connected phase gap map to obtain a filled connected phase gap map. The methods can further include applying a fit function to the filled connected phase gap map. The fit can be a linear least-squares fit.

In some implementations, modifying the coherence profile based on the phase gap map can include adding the phase gap map to the coherence profile.

In some implementations, obtaining the scanning interferometry data can include interfering a measurement wavefront reflected from the test object surface with a reference wavefront to obtain an interference intensity signal $I(\zeta,x,y)$, the measurement wavefront and reference wavefront being derived from a common source, $\zeta$ corresponding to a scan position of the test object surface, and x and y corresponding to field positions on the test object surface along orthogonal directions, and recording the interference intensity signal $I(\zeta, x,y)$ at a detector.

In some implementations, the scanning interferometry data includes multiple interference signals, and the coherence profile is calculated from a localization of interference fringes in each interference signal.

In some implementations, the scanning interferometry data includes multiple interference signals, and the phase profile is calculated from a phase of a transform of the multiple interference signals. The transform can include a Fourier transform.

In general, another aspect of the subject matter described in this specification can be embodied in a scanning interferometer system that includes an optical system configured to obtain scanning interferometry data from a test object surface, and a processor comprising code configured to: obtain the scanning interferometry data from the optical system, calculate a coherence profile of the test object surface and a phase profile of the test object surface based on the scanning interferometry data, calculate a phase gap map based on the coherence profile and the phase profile, modify the coherence profile based on the phase gap map to obtain a corrected coherence profile, and determine a height of the test object surface based on the corrected coherence profile.

In general, another aspect of the subject matter described in this specification can be embodied in methods for determining a height of a test object surface, in which the methods include detecting, at a detector, a plurality of interference signals, calculating a coherence profile and a phase profile based on the plurality of interference signals, determining a phase gap map between the coherence profile and the phase profile, modifying the coherence profile based on the phase gap map to obtain a corrected coherence profile, and determining a height of a test object surface based on the corrected coherence profile.

In general, another aspect of the subject matter described in this specification can be embodied in methods for determining a height of a test object surface, in which the methods include generating, using a coherence scanning interferometer, a coherence profile and a phase profile, processing the coherence profile and the phase profile to generate a phase gap map representing a difference between the phase profile and the coherence profile, using the phase gap map to correct distortions in the coherence profile that do not appear in the phase profile, and determining the height of the test object surface based on the coherence profile having the distortions corrected.

The methods and other embodiments can each optionally include one or more of the following features. For example, in some implementations, the method can further include removing fringe order steps from the phase gap map. In some implementations, each of the coherence profile and the phase profile corresponds to a 3D profile or a 2D cross section profile of the test object surface.

The present techniques, systems and devices offer various advantages. For example, in some implementations, height profiling measurements for a wide variety of textured surfaces can be performed with a reduction in errors due to distortion and vibrations. In some implementations, the reduction in errors resulting from distortion and vibration can lead to improved accuracy for roughness measurements, including measurements of roughness standards. In some implementations, the complex processes that would otherwise be used for determining and correcting fringe order errors are eliminated.

All publications, patent applications, patents and other references mentioned herein are incorporated by reference in their entirety.

The details of one or more embodiments are set forth in the accompanying drawings and the description below. Other features and advantages will be apparent from the description, the drawings, and the claims.

BRIEF DESCRIPTION OF DRAWINGS

FIG. 6 is a chart of possible appearance and interpretations of the theoretical phase gap with noise terms.

DETAILED DESCRIPTION

An interference signal recorded by a detector pixel includes localized fringes produced by the interference of a reference wave and a measurement wave reflected from a particular point on an object's surface, in which the fringes are modulated by a coherence envelope. When multiple interference signals are recorded, both a coherence profile and phase profile can be obtained, in which the coherence profile corresponds to a measure of the fringe localization across the object's surface and the phase profile corresponds to a measure of the phase of the quasi-periodic oscillations across the object's surface.

Figure 1:
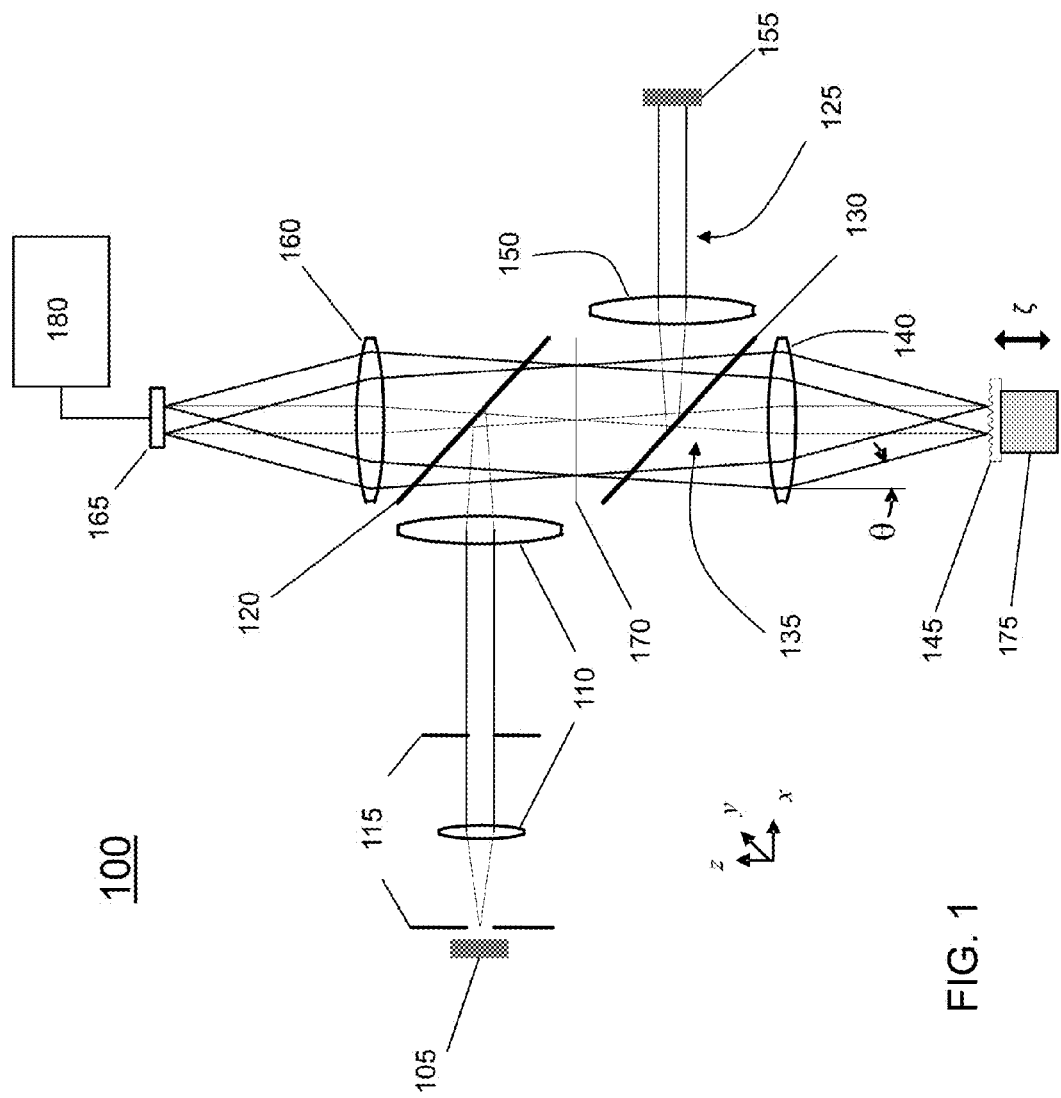
FIG. 1 is a schematic of an example coherence scanning interferometry system.

The precision with which a coherence profile can be used to determine an object's surface features can be improved based on the use of a phase gap map, which represents the difference between the coherence profile and the phase profile of the object's surface. The phase gap map can correct for distortions in the original coherence profile, thus enabling a mode of measurement that can accommodate a wide range of surface textures and also has high sensitivity to noise. The coherence profiles and phase profiles can be acquired with a coherence scanning interferometry system (also known as a scanning white light interferometry (SWLI) system), such as interferometry system 100 shown in FIG. 1. See, e.g. U.S. Pat. No. 7,106,454, incorporated herein by reference in its entirety.

Coherence scanning interferometry system 100 is based on a Michelson interferometer with an adjustable optical path length in the measurement leg.

In coherence scanning interferometry system 100, light from a source 105 is collimated with lenses 110 and apertures 115. Using an illumination beam-splitter 120, the collimated light is then coupled into an interferometer unit with an imaging optical path and a reference optical path, which partly overlap. The interferometer unit includes an interferometer beam-splitter 130 which separates light from illumination beam-splitter 120 into reference light and measurement light. Reference light 125, which is reflected from interferometer beam-splitter 130, reflects from a reference object 155 (e.g., a mirror) back towards interferometer beam-splitter 130.

Measurement light 135 is transmitted by interferometer beam-splitter 130 and reflects from a test object 145 positioned on a scanning stage 175 which is configured to vary the optical path length of measurement light 135 by moving test object 145 relative to beam-splitter 130. Test light reflected from test object 145 returns to beam-splitter 130 where it recombines with reflected reference light to form the interferometer's output beam.

The interferometer also includes a measurement objective lens 140 positioned in the path of measurement light 135 and a corresponding reference objective lens 150 positioned in the path of reference light 125. Measurement objective lens 140 and reference objective lens 150 can have common optical properties (e.g., matched numerical apertures). Although measurement objective lens 140 and reference objective lens 150 are depicted as single lens elements, in embodiments, these lenses can be compound lenses.

An imaging lens 160 is positioned in the path of the output beam and images the test object 145 onto a detector 165, which is in communication with an electronic processor 180 (e.g., a computer). Detector 165 includes multiple detector elements, e.g., it can be a pixilated detector such as a pixilated camera.

Similarly, imaging lens 160 images reference object 155 (e.g., a reference mirror) onto the detector 165. Accordingly, detector 165 detects an intensity pattern that results from the measurement and reference light interfering at detector 165.

During operation, scanning stage 175 coupled to test object 145 scans the position of test object 145 relative to beam-splitter 130 as denoted by a scan coordinate ζ. Scanning stage 175 can be based, for example, on a piezoelectric transducer. By varying the position of test object 145, scanner 175 varies the optical path length difference (OPD) between the test and measurement light at detector 165, thereby varying the detected intensity pattern. Typically, detector 165 acquires a series of intensity measurements at each detector element so that each detector element provides a corresponding interference signal which can be analyzed by electronic processor 180.

While interferometry system 100 operates by scanning test object 145, the scanning of the OPD can be achieved by scanning the objective 140 relative to the test object 145 or by scanning reference object 155 relative to interferometer beam-splitter 130.

In addition to acquiring interference signals from detector 165, electronic controller 180 may also control one or more components of interferometry system 100, such as light source 105, scanner stage 175, and/or detector 165.

Figure 2:
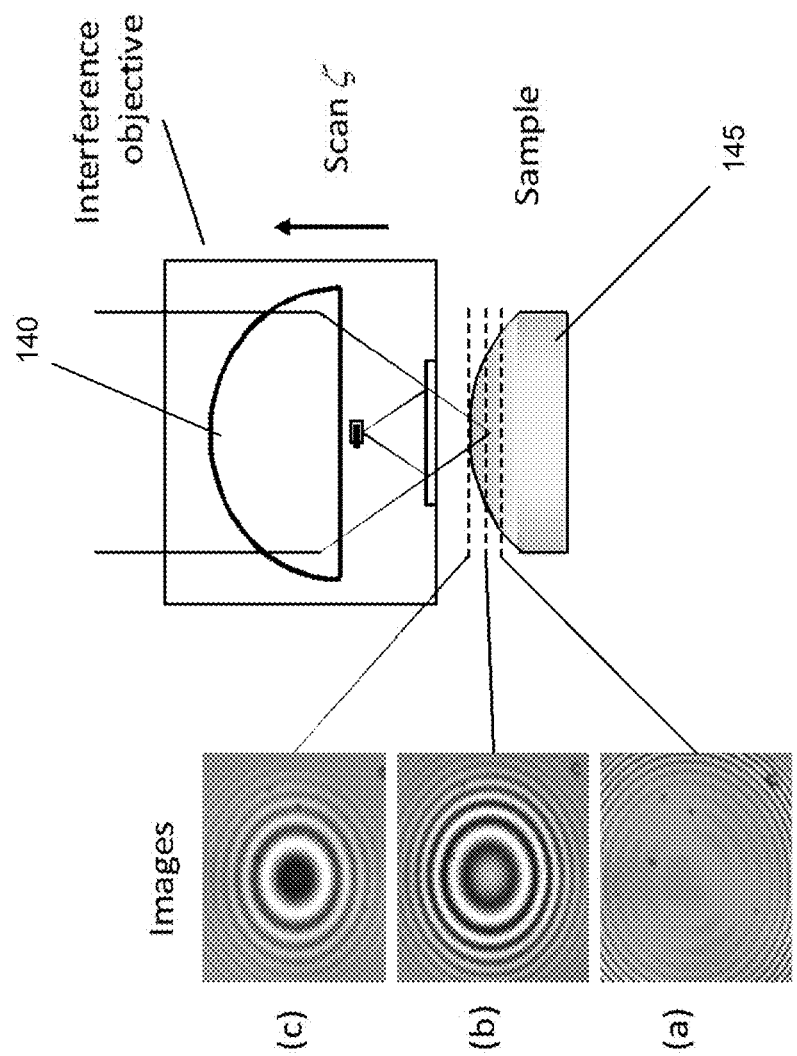
FIG. 2 is a schematic illustration of localization of an interference signal obtained from a coherence scanning interferometer.

Coherence scanning interferometry (CSI) generally refers to a technique for 3D imaging based in part on the localization of interference fringes. FIG. 2 is a schematic that illustrates a conceptual explanation of how localization allows sectioning of a sample surface according to height using the presence of interference fringes as a guide. In FIG. 2, the test object 145 is illuminated using a Mirau configuration in which the objective 140 is scanned relative to the test object 145. The photos labeled (a)-(c) are a series of images recorded by the detector as the topmost surface of the test object 145 passes through a focal plane of objective 140. For example, when the surface of the test object 145 (represented by dashed lines) is below the focal plane, the image detected by the system corresponds to the photo at (a). When the surface of the test object 145 is at the focal plane, the image detected by the system corresponds to the photo at (b). And when the test object surface is above the focal plane, the image detected by the system corresponds to the photo at (c). The corresponding signal recorded at a pixel of the detector 165 includes interference fringes modulated by a coherence envelope.

Figure 3:
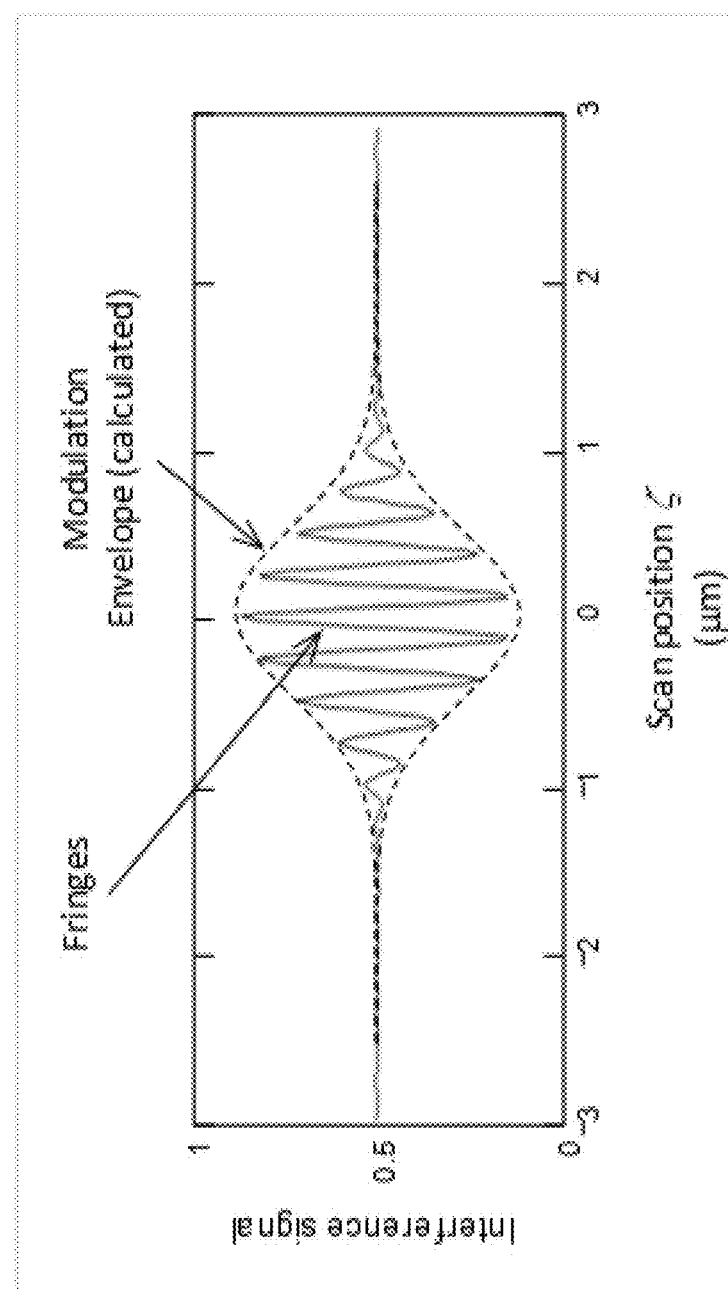
FIG. 3 is an example plot of intensity recorded at a detector pixel versus scan position of a measurement objective for an image obtained by interfering a reference wave and a measurement wave reflected from a test object surface.

FIG. 3 is an example plot of intensity recorded at a detector pixel versus scan position of the measurement objective 140 for an image obtained by interfering a reference wave and a measurement wave reflected from a test object surface. As shown in the example plot, the interference signal includes rapidly oscillating interference fringes 302 modulated by a coherence envelope 304 (the dashed lines are used as a visualization aid and do not actually appear when an interference signal is recorded). The coherence envelope 304 is related to the mutual optical coherence of the reference and measurement beams when they reach the detector.

Local surface height information about the test object can be extracted from the recorded interference signal using two possible techniques: coherence profiling or phase profiling. In coherence profiling, features of the modulation envelope, such as the peak signal or the centroid of the signal are used to determine height information. In phase profiling, the phase of the interference fringes is used to determine height information.

In general, conventional coherence profiling can be an effective method for obtaining surface topography maps on both smooth and rough surfaces. However, coherence profiling also can suffer from sensitivity errors such as optical aberrations, diffraction, vibration and noise. For example, coherence profiling can have a noise level about ten times higher than phase profiling and can be about ten times more sensitive to vibrations than phase profiling.

Although typically more precise than coherence profiling, conventional phase profiling can also have limitations related to determining the fringe order. Stated mathematically, the interference phase for an individual image pixel can be known to within a range corresponding to one individual interference fringe (see, e.g., FIG. 3). This restricts the range of surface heights that may be evaluated using interference phase alone to something less than one-half the wavelength in a typical interferometer. This problem is sometimes referred to as fringe order ambiguity and can lead to $2\pi$ errors that result in unacceptable jumps of one-half wavelength in the surface profile map. Additional information regarding coherence profiling and phase profiling techniques can be found in U.S. Pat. Nos. 6,775,006 and 6,989,905, each of which is incorporated herein by reference in its entirety.

Certain techniques use a phase gap difference between the coherence profile and phase profile to correct the phase profile and thus obtain height information for a test object. However, this process can include an especially complex process to determine and correct for fringe order ambiguity. Furthermore, the process is effective to varying degrees based on the experimental conditions, such as surface texture and form. In some implementations, the process of trying to determining fringe orders can become so difficult that the resulting 3D phase profiles exhibit many fringe order errors, often referred to as $2\pi$ errors, such that phase profiling is not a useful method for obtaining height information.

The inventors have realized that by combining information from the coherence height profile and the phase profile; however, it is possible, in some implementations, to provide an enhanced profiling technique that functions well over both rough and smooth surfaces. In particular, the phase gap map can be used to determine and correct distortions in the coherence profile, as opposed to the phase profile. Such a technique can provide an improved method of coherence profiling in which sensitivity to vibration and profile distortions are reduced.

Figure 4:
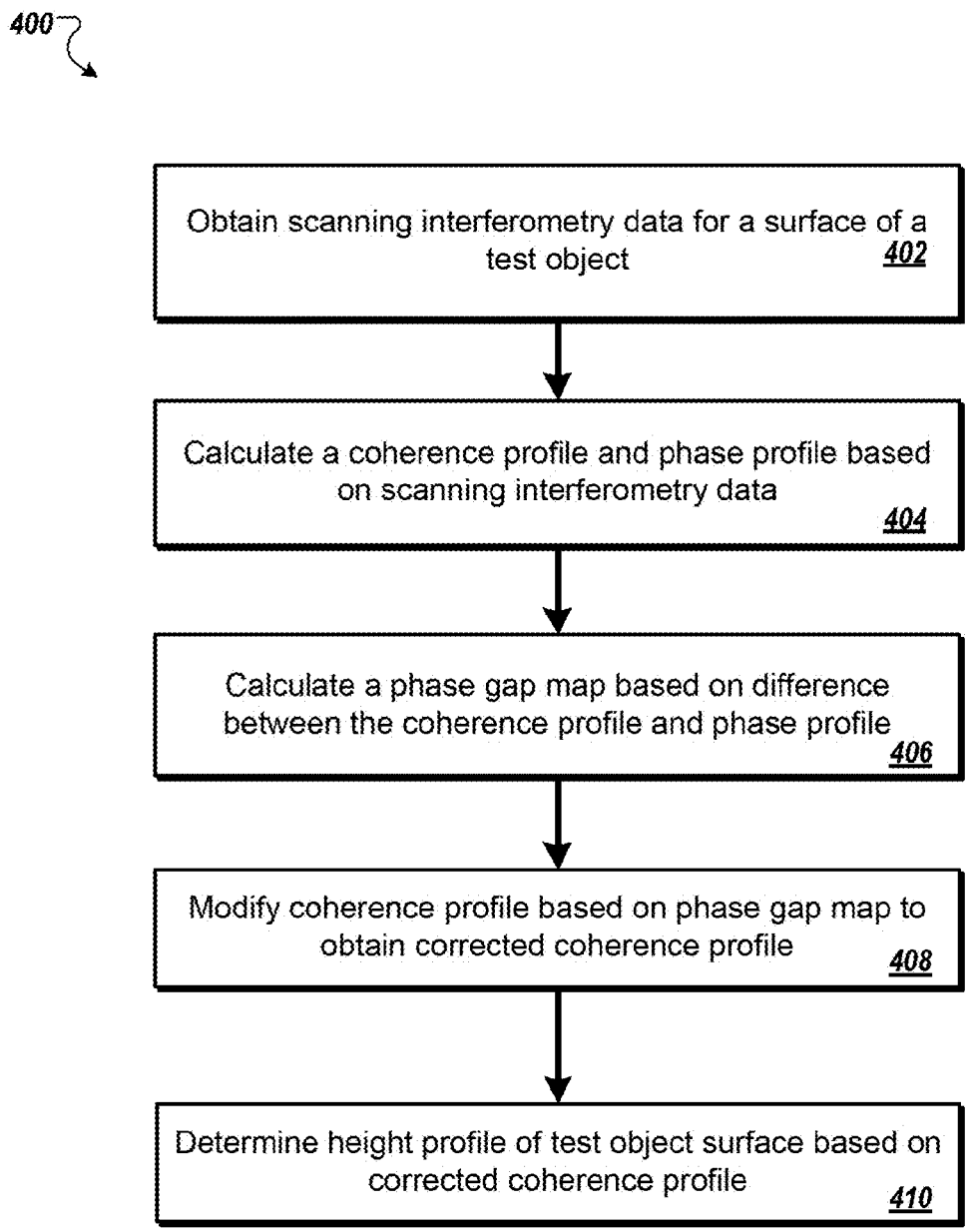
FIG. 4 is a flow chart depicting a process of correcting vibration and distortion errors in a coherence profile.

FIG. 4 is a flow chart depicting a process 400 of correcting vibration and distortion errors in a coherence profile to provide a surface profiling technique that is effective for a wide variety of surfaces with reduced sensitivity to vibration and noise. The process can be performed utilizing coherence scanning interferometry system such as the system 100 shown in FIG. 1. The basic procedure is described below and is followed by a more detailed description.

To begin the process 400, scanning interferometry data is obtained (402) for a surface of a test object. The data can be obtained by scanning a measurement objective with respect to a test object or by scanning a reference objective of the interferometer system, and recording the interference pattern produced by combining reference waves with measurement waves reflected from the test object at a detector surface. The recorded scanning interferometry data then is provided to electronic processor 180, which calculates (404) both a coherence profile and a phase profile based on the coherence envelopes and interference fringe phase associated with each interference signal. The processor 180 then calculates (406) a phase gap map based on a difference between the coherence profile and the phase profile. Under ideal conditions and without errors, the two profiles should match and the phase gap between the profiles should be constant. Errors disrupt this match, however, and are apparent in the phase gap. Using the phase gap map, the processor 180 then determines distortions existing in the coherence profile and modifies (408) the coherence profile based on the phase gap map to obtain a corrected coherence profile. The processor 180 then determines (410) a height profile of the test object surface based on the corrected coherence profile.

In stage (402) of process 400, the processor 180 records intensity data $I(\zeta,x)$ in successive camera frames during a continuous scan, where we have abbreviated the x,y lateral field position of the pixel simply as x. The intensity as a function of scan position is given by $$I(\zeta,x)=1+V[h(x)+\tau(x)/2n-\zeta]\cos[2nk_0(h(x)-\zeta)+\gamma(x)] \quad (1)$$

where V is the fringe contrast envelope. At normal incidence (low numerical aperture imaging), the envelope V is proportional to the Fourier transform of the spectral distribution of the light as detected by the camera, including the spectral sensitivity of the camera itself $\zeta$ is the reference mirror scan position which corresponds to the optical-path difference, where a $\zeta=0$ scan position corresponds to a zero optical path difference at datum H. $\gamma(x)$ is the phase change on reflection (PCOR) evaluated at the nominal wavenumber $k_0$. It is well known that upon reflection from a surface, a light beam is given an additional phase offset dependent on the optical properties of the reflecting surface. This is the physical basis for PCOR. The value of $\gamma(x)$ includes PCOR contributions from not only the sample but also the interferometer optics, and any constant offsets resulting, e.g., from the starting position of the scan $\zeta$. The coefficient $\tau(x)$ corresponds to the linear dispersion of PCOR evaluated at the nominal wavenumber $k_0$. Dispersion in PCOR results from the frequency dependence of the PCOR. A first order (linear) correction for this frequency dependence is given by $\tau(x)$.

The distance traveled by the test object (or by the reference mirror, depending on interferometer arrangement) between two successive camera frames is the fundamental unit of measure. This distance is defined as a frame and will be used throughout. This is quite different from conventional phase shifting interferometry, for which the light source wavelength is the basic metric. For this reason, all height- or scan-related variables are expressed in frame units or the equivalent. The height profile $h(x)$ itself will be calculated in frame units.

An example of such intensity vs. scan position data is shown in FIG. 3. The broadband interference pattern shown in FIG. 3 is highly localized near the zero optical path difference position, for which the scan position $\zeta$ is close to $h(x)$. To conserve memory and accelerate computations, stage (402) of process 400 includes sub-sampling the interference pattern and recording a 64-frame data trace centered on this high-contrast position. The scan position $\zeta_{start}(x)$ corresponding to the first camera frame of the data trace is typically different for at least some of the pixels in the field of view because of the structure of the test object.

Using the interferometric data, stage (404) of process 400 includes calculating both the coherence and phase profile. The method may analyze the fringe contrast of the intensity pattern shown in FIG. 3. Alternatively, a frequency-domain analysis (FDA) method focuses on the behavior of the interference phase as a function of wavenumber in the Fourier decomposition of $I(\zeta,x)$, as taught in U.S. Pat. No. 5,398,113, incorporated by reference in its entirety. Following data acquisition, stage (404) includes performing a Fourier transform (FT), resulting in spectrum data $P(k,x)$ and phase data $\phi(k,x)$:

$$P(k,x) = |FT[I(\zeta,x)]|^2 \quad (2)$$

$$\phi(k,x) = \arg\{FT[I(\zeta,x)]\} \quad (3)$$

where k is the wavenumber. A typical value for k is $\pi/2$ radians/frame, the equivalent of 4 camera frames per cycle of interference or 16 cycles per 64-frame trace.

The useful phase data $\phi(k,x)$ generated by the Fourier transform in Eq. (3) are restricted to a wavenumber range consistent with the spectral distribution $P(k,x)$ of the source. The peak in the spectrum defines a nominal wavenumber $k_0$ and a useful spectral range beginning at $k_0-k_\Delta$. A linear least-squares fit to the phase data within this range, weighted by the spectral distribution $P(k,x)$, provides for each pixel a slope $$a(x) = d\phi/dk|_x \quad (4)$$

and an intercept $$b(x)=\phi(k_0-k_\Delta,x) \quad (5)$$

The phase slope offset by the starting scan position $\zeta_{start}(x)$ can be used to define a coherence profile, expressed here in phase units at the nominal wavenumber $k_0$:

$$\Theta(x)=k_0 a(x)+k_0 \zeta_{start}(x) \quad (6)$$

The coherence profile is closely related to the localization of the interference fringes. The phase at $k_0$ offset by the starting scan position $\zeta_{start}(x)$ can be used to define the phase profile:

$$\theta(x)=k_\Delta a(x)+b(x)+k_0 \zeta_{start}(x) \quad (7)$$

In Eq. (7), potential fringe-order ambiguity is suppressed for the sake of clarity in the theoretical presentation.

Figure 5:
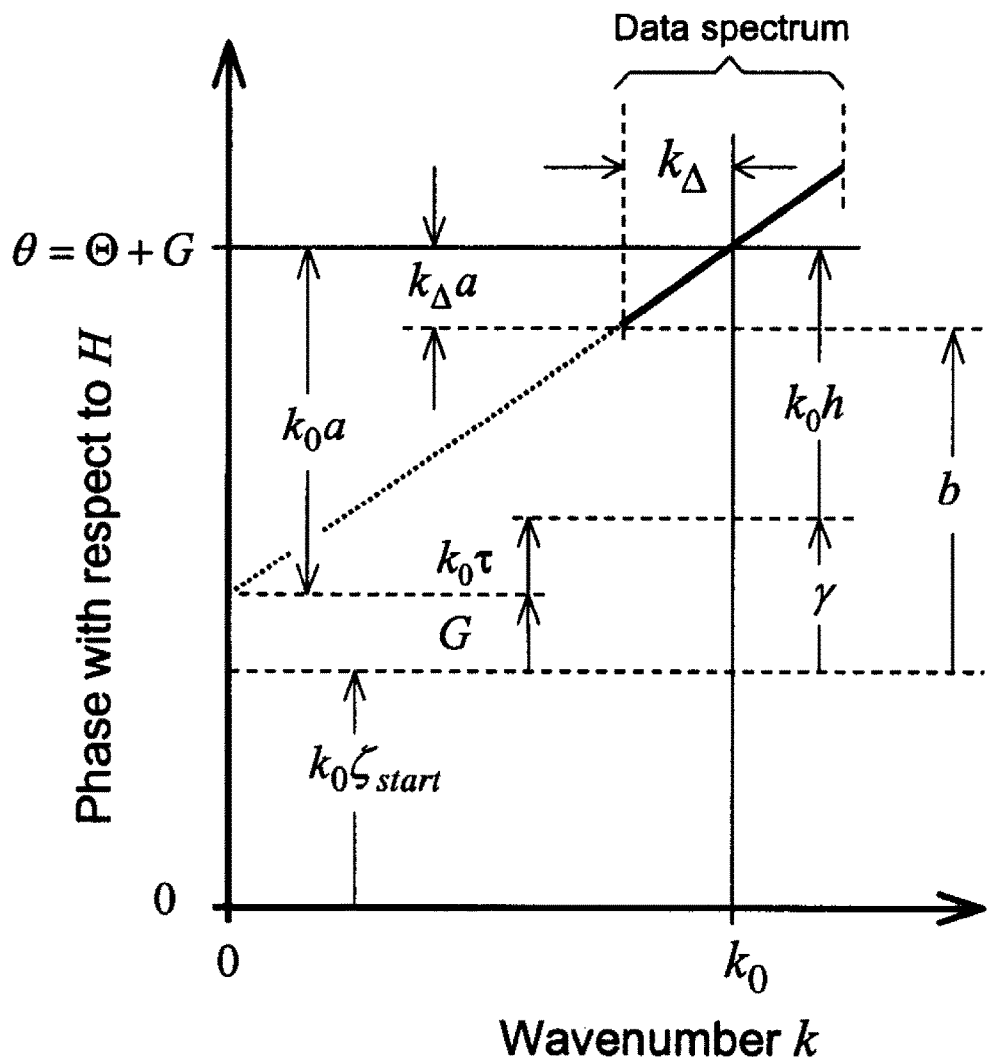
FIG. 5 is a phase and frequency domain graph of the Fourier transform of coherence scanning interferometry data.

The coherence and phase profiles are both indicative of surface height profile. FIG. 5 is a phase and frequency domain graph of the Fourier transform of coherence scanning interferometry data. The quantity G is the phase gap, which is a measure of agreement between coherence and phase data. In a linear expansion, the interference phase $\phi(k,x)$ about a nominal wavenumber $k_0$ near the center of the FT spectrum is $$\phi(k,x) = k[h(x) - \zeta_{start}(x)] + \gamma(x) + (k-k_0)\tau(x). \quad (8)$$

From Eq. (8) we can extract two formulas for surface height with respect to the optical datum H using the phase and coherence profiles. Using the definitions of $\theta(x)$, $\Theta(x)$ from the previous page, inversion of Eq. (8) at $k=k_0$ yields a height profile based on the phase profile $\theta(x)$ $$h(x) = \frac{1}{k_0}[\theta(x) - \gamma(x)]. \quad (9)$$

Inversion of the derivative of Eq. (8) with respect to k gives a different measure of the height based on the coherence profile $\Theta(x)$ $$h(x) = \frac{1}{k_0}[\Theta(x) - k_0\tau(x)]. \quad (10)$$

Eq. (9) is the basis for a high-resolution measurement of surface height; however, in that phase detection is periodic in $2\pi$ radians, there is a potentially unknown fringe order offset to an experimental measurement of $\theta(x)$. The coherence-based calculation of Eq. (10) is inherently lower resolution than Eq. (9), but is free of fringe-order ambiguity.

As mentioned above, the coherence and phase information can be used to obtain a corrected coherence profile, and thus height information. Of particular interest is the difference or phase gap G(x) between the phase and coherence profiles. The phase gap G(x) is determined in stage (406) of process 400 and may be defined as:

$$G(x)=\theta(x)-\Theta(x). \quad (11)$$

In theory, the phase gap is the k=0 intercept of the phase data and is given by $$G(x)=\gamma(x)-k_0\tau(x). \quad (12)$$

It is clear from Eq. (11) that the phase gap G(x) is a measure of the agreement between the phase profile and the coherence profile (see FIG. 3). The phase gap plays an important role in the detailed error processing that follows.

The phase gap G(x) contains noise from both the phase and coherence profiles, as well as fringe order steps from the phase profile. We estimate G(x) using a connected version $\Gamma(x)$ of the experimentally measured phase gap $G_{ex}(x)$.

One way to estimate G(x) is to assume it to be a constant average value over the field of view, as disclosed, for example, in U.S. Pat. No. 5,398,113. However, in practice, we have found that there are frequently distortions in the phase gap attributable to the x field dependence of the phase and dispersion offsets $\gamma(x)$, $\tau(x)$. FIG. 6 is a chart of possible appearance and interpretations of the theoretical phase gap with noise terms. So even in the absence of noise, the simple averaging technique to approximate G(x) is an over-simplification.

A preferred approach to estimating G(x) is connecting the experimental phase gap applying one of the many known techniques for adding or subtracting $2-\pi$ to data in adjacent pixels. This approach preserves the general form of the phase gap so that one can separate the fringe order from distortions traceable to the coherence profile. The $2-\pi$ steps between neighboring pixels of $G_{ex}(x)$ can be connected by using standard phase connecting or "unwrapping" techniques. Several processing steps may be incorporated to suppress noise and distortions in the phase gap and facilitate connecting the experimental phase gap, as taught for example in the paper "Determination of fringe order in white light interference microscopy," Appl. Opt. 41(22) 4571-4578 (2002), and in U.S. Pat. Nos. 6,775,006 and 6,989,905, each of which is incorporated herein by reference in its entirety. These processing steps include smoothing the coherence profile prior to calculating the phase gap, and fitting surfaces to improve robustness.

In the estimated phase gap $\Gamma(x, y)$ derived from processing of the experimental phase gap $G_{ex}(x)$, stage (408) of process 400 can include modifying the coherence profile based on the phase gap to obtain a corrected coherence profile. For instance, the corrected coherence profile can be calculated as $$\Theta_{NEW}(x,y)=\Theta(x,y)+\gamma(x,y) \quad (13)$$

The final experimental height is calculated in stage (410) in which a height profile is calculated from the corrected coherence profile, $$h_{NEW}(x, y) = \frac{\Theta_{NEW}(x, y)}{k_0}. \quad (14)$$

Note that this height value is in units of camera frames, assuming that the phase values are in radians and $k_0$ is in units of radians per frame.

Figure 7A:
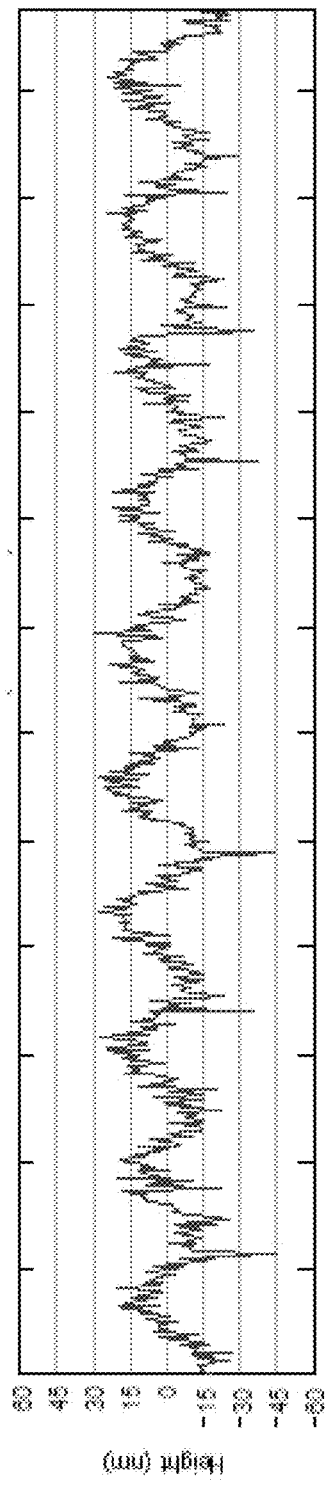
FIG. 7A is an experimental plot of a coherence height profile for test object data obtained from a coherence scanning interferometer.
Figure 7B:
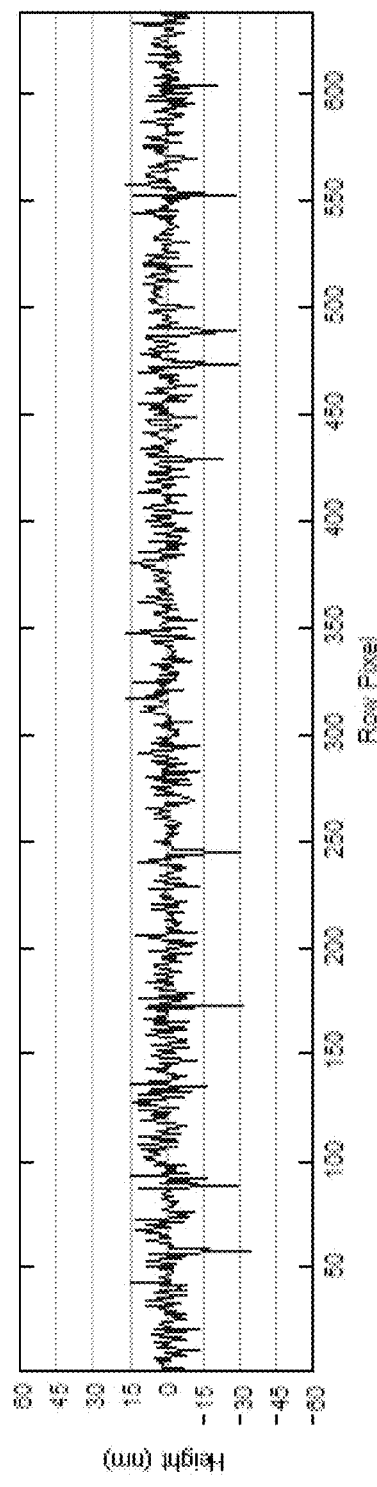
FIG. 7B is an experimental plot of a corrected coherence height profile based on the same test object data in FIG. 7A.

FIG. 7A is an experimental plot of a coherence height profile calculated based on using Eq. 6 for test object data obtained from a coherence scanning interferometer. FIG. 7B is an experimental plot of a corrected coherence height profile calculated using the process 400, based on the same test object data in FIG. 7A. The sample imaged for each of the plots was a smooth flat. Cyclic distortions due to vibrations are visible in the height profile of FIG. 7A. In contrast, when the height profile is calculated using the process 400, there is a significant reduction in the periodic distortion (see FIG. 7B).

Figure 8A:
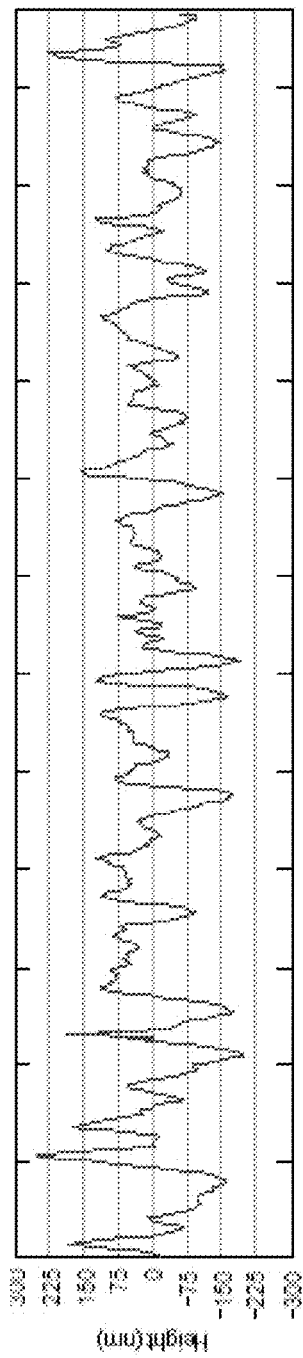
FIG. 8A is an experimental plot of a coherence height profile where the test object is a roughness reference specimen
Figure 8B:
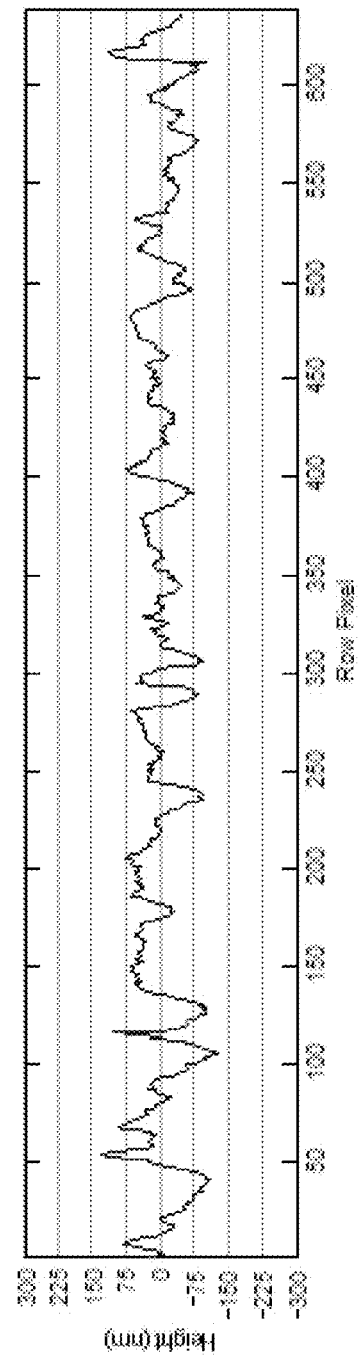
FIG. 8B is an experimental plot of a corrected coherence height profile based on the same test object data in FIG. 8A.

FIG. 8A is an experimental plot of a coherence height profile calculated based on using Eq. 6 where the test object is a roughness reference specimen (Rubert & Co. Ltd. Part No. 502) with an average amplitude, Ra, of 38 nm. Distortions in the data resulted in an incorrect Ra measurement of 66 nm. FIG. 8B is an experimental plot of a corrected coherence height profile calculated using the process 400, based on the same test object data in FIG. 8A. The corrected height profile provided an Ra measurement of 38 nm.

Figure 9A:
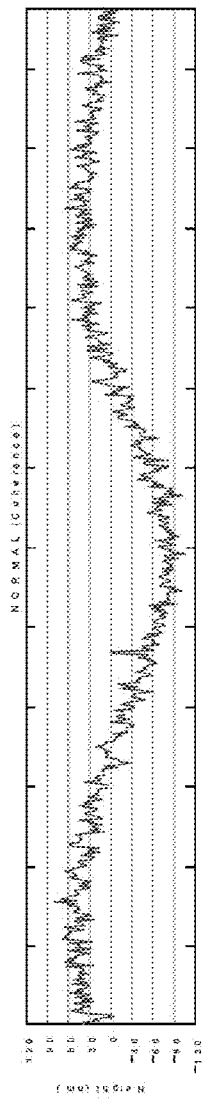
FIG. 9A is an experimental plot of a coherence height profile for a surface flat.
Figure 9B:
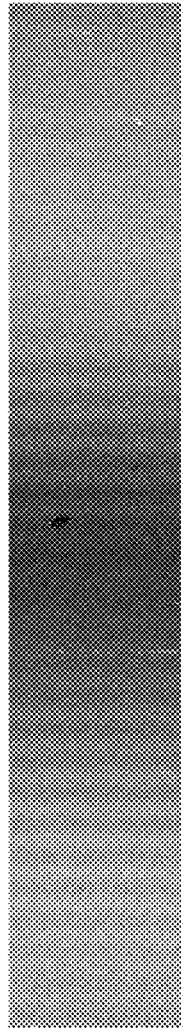
FIG. 9B is a photograph of the same data as shown in FIG. 9A, but illustrated in grey-level 3D imaging.
Figure 9C:
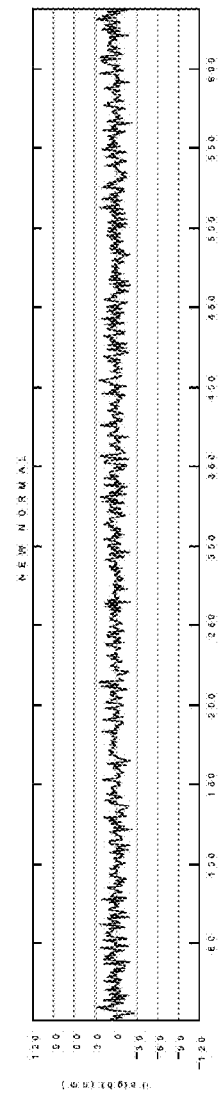
FIG. 9C is an experimental plot of a corrected coherence height profile based on the same data used for FIG. 9A.
Figure 9D:
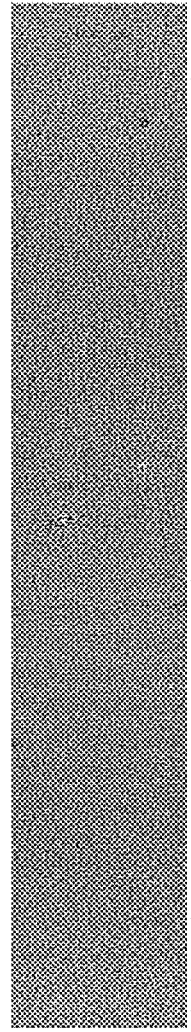
FIG. 9D is a photograph of the corrected height profile of FIG. 9C in grey-level 3D imaging.

FIG. 9A is another experimental plot of a coherence height profile for a surface flat with 17 tilt interference fringes laterally introduced by tilting the object about a vertical axis in the plane of the figure. As is evident in the plot, there is a substantial sinusoidal variation in the height profile data. FIG. 9B is a photograph of the same data as shown in FIG. 9A, but illustrated in grey-level 3D imaging to make the high-frequency ripple errors more evident. FIG. 9C is an experimental plot of a corrected coherence height profile based on the same data used for FIG. 9A. Similarly, FIG. 9D is a photograph of the corrected height profile in grey-level 3D imaging. As can be seen from FIGS. 9C and 9D, the high-frequency ripple errors are substantially reduced using the corrected coherence profile.

The data processing procedures described above can be applied to a large range of interferometry systems and particularly, to any height scanning interferometers. For example, the light source in the interferometer may be any of: an incandescent source, such as a halogen bulb or metal halide lamp, with or without spectral band-pass filters; a broadband laser diode; a light-emitting diode; a combination of several light sources of the same or different types; an arc lamp; any source in the visible spectral region; any source in the IR spectral region, particularly for viewing rough surfaces & applying coherence profiling; any source in the UV spectral region, particularly for enhanced lateral resolution; and any source or combination of sources having a net spectral bandwidth broader than 0.1% of the mean wavelength. Furthermore, the scanning system may be: driven by any of a piezoelectric device, a stepper motor, and a voice coil; implemented opto-mechanically or opto-electronically rather than by pure translation (e.g., by using any of liquid crystals, electro-optic effects, strained fibers, and rotating waveplates); any of a driver with a flexure mount and any driver with a mechanical stage, e.g. roller bearings or air bearings. Also, the interferometer optics may form any of: an interferometric microscope employing, e.g., a Mirau or Michelson objective lens; a Twyman Green system; a Fizeau interferometer employing a filtered or structured source spectrum so as to provide coherence peaks far from zero OPD; a fiber interferometer; and a Mach Zehnder, particularly for profiling transparent media. Finally, the data analysis may involve any of: frequency domain analysis (FDA); peak-fringe analysis; dynamic filtering to extract the fringe visibility in real time; a least-squares technique to extract fringe visibility and phase at the same time; and fringe visibility analysis followed by phase analysis, potentially including a separate measurement for phase with a modified source spectrum. The interferometry system described herein can be used to perform various surface metrology measurements. For example, the imaging system can be used for surface roughness/smoothness and step height measurements, two-dimensional and three-dimensional surface topology profiling, and edge detection.

In general, any of the height profiling methods described above can be implemented in computer hardware or software, or a combination of both. For example, in some embodiments, the electronic processors can be installed in a computer and connected to one or more interferometry systems and configured to perform analysis of interference signals obtained from the interferometer system. Analysis can be implemented in computer programs using standard programming techniques following the methods described herein. Program code is applied to input data (e.g., interference signals) to perform the functions described herein and generate output information (e.g., height profiles). The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis methods can also be implemented as a computer-readable storage medium, configured with a computer program, where the storage medium so configured causes a computer to operate in a specific and predefined manner to perform the functions described herein.

A number of embodiments have been described. Nevertheless, it will be understood that various modifications may be made. Accordingly, other embodiments are within the scope of the following claims.

What is claimed is:

1. A method of determining physical information about a test object surface, the method comprising:
    obtaining, from a scanning interferometry device, scanning interferometry data for a surface of the test object;
    calculating a coherence profile of the surface of the test object and a phase profile of the surface of the test object based on the scanning interferometry data;
    calculating a phase gap map based on the coherence profile and the phase profile;
    modifying, using an electronic processor, the coherence profile based on the phase gap map to obtain a corrected coherence profile; and
    determining the information about the surface of the test object based on the corrected coherence profile.

2. The method of claim 1, wherein the information about the test object comprises a height profile of the test object.

3. The method of claim 1, wherein calculating the phase gap map comprises expressing the coherence profile and the phase profile in common units.

4. The method of claim 3, wherein the common unit is radians.

5. The method of claim 1, wherein the calculating the phase gap map comprises calculating a difference between the coherence profile and the phase profile to obtain an experimental phase gap map.

6. The method of claim 5, wherein calculating the phase gap map further comprises reducing noise of the experimental phase gap map.

7. The method of claim 6, wherein reducing noise comprises applying a smoothing filter to the experimental phase gap map.

8. The method of claim 7, wherein the smoothing filter comprises a pixel-averaging algorithm or a convolution algorithm.

9. The method of claim 7, wherein reducing noise further comprises calculating a disconnected phase gap map based on a difference between the experimental phase gap map and a smoothed phase gap map.

10. The method of claim 9, wherein reducing noise further comprises removing $2\pi$ steps from the disconnected phase gap map to obtain a connected phase gap map.

11. The method of claim 10, wherein reducing noise further comprises filling in unconnected pixels of the connected phase gap map to obtain a filled connected phase gap map.

12. The method of claim 11, further comprising applying a fit function to the filled connected phase gap map.

13. The method of claim 12, wherein the fit is a linear least-squares fit.

14. The method of claim 1, wherein modifying the coherence profile based on the phase gap map comprises adding the phase gap map to the coherence profile.

15. The method of claim 1, wherein obtaining the scanning interferometry data comprises:
    interfering a measurement wavefront reflected from the test object surface with a reference wavefront to obtain an intensity pattern $I(\zeta,x,y)$, the measurement wavefront and reference wavefront being derived from a common source, $\zeta$ corresponding to a scan position of the test object surface, and x and y corresponding to positions on the test object surface along orthogonal directions; and
    recording the intensity pattern $I(\zeta,x,y)$ at a detector.

16. The method of claim 1, wherein the scanning interferometry data includes a plurality of interference signals, and the coherence profile is calculated from a localization of interference fringes in each interference signal.

17. The method of claim 1, wherein the scanning interferometry data includes a plurality of interference signals, and the phase profile is calculated from a phase of a transform of the plurality of interference signals.

18. The method of claim 17, wherein the transform is a Fourier transform.

19. A scanning interferometer system comprising:
    an optical system configured to obtain scanning interferometry data from a test object surface; and
    an electronic processing module comprising code configured to:
    obtain the scanning interferometry data from the optical system;
    calculate a coherence profile of the test object surface and a phase profile of the test object surface based on the scanning interferometry data;
    calculate a phase gap map based on the coherence profile and the phase profile;

modify the coherence profile based on the phase gap map to obtain a corrected coherence profile; and determine information about the test object surface based on the corrected coherence profile.

20. The scanning interferometer system of claim 19, wherein the information about the test object surface comprises a height profile of the test object surface.

21. A method of determining physical information about a test object surface, the method comprising:

detecting, at a detector, a plurality of interference signals;

calculating a coherence profile and a phase profile based on the plurality of interference signals;

determining a phase gap map between the coherence profile and the phase profile;

modifying the coherence profile based on the phase gap map to obtain a corrected coherence profile; and determining the information about the test object surface based on the corrected coherence profile.

22. The method of claim 21, wherein the information comprises a height profile of the test object surface.

23. A method of determining physical information about a test object surface, the method comprising:

generating, using a coherence scanning interferometer, a coherence profile and a phase profile;

processing the coherence profile and the phase profile to generate a phase gap map representing a difference between the phase profile and the coherence profile;

using an electronic processor to correct, based on the phase gap map, distortions in the coherence profile that do not appear in the phase profile; and determining the information about the test object surface based on the coherence profile having the distortions corrected.

24. The method of claim 23, wherein the information comprises a height profile of the test object surface.

25. The method of claim 23, further comprising removing fringe order steps from the phase gap map.

26. The method of claim 23, wherein each of the coherence profile and the phase profile corresponds to a 3D profile or a 2D cross section profile of the test object surface.

* * * * *